Nov. 12, 1957 N. MAKAY 2,813,121
RECOVERY OF OXALIC AND TARTARIC ACID
Filed March 8, 1956
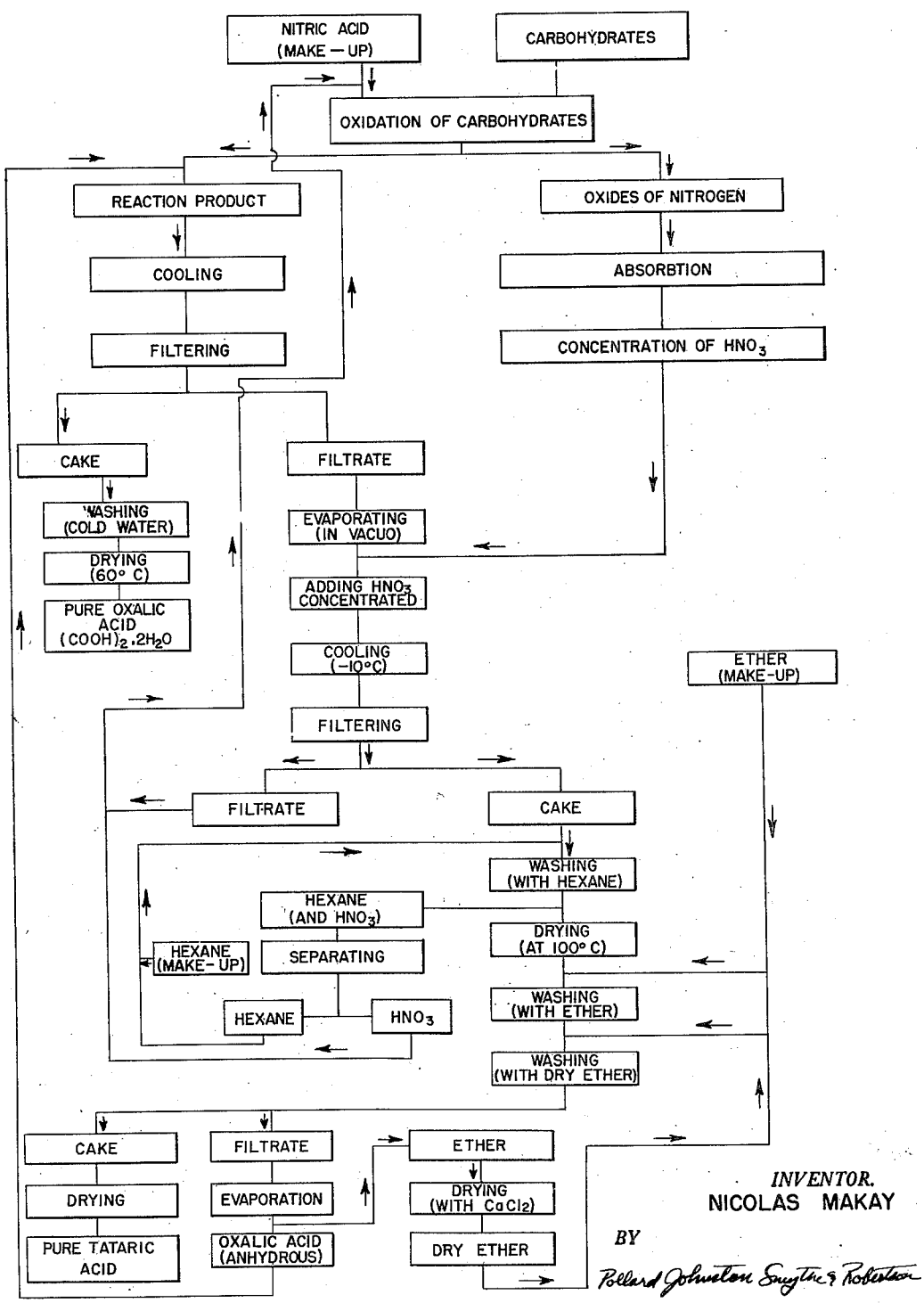
INVENTOR.
NICOLAS MAKAY
BY
ATTORNEYS

United States Patent Office 2,813,121
Patented Nov. 12, 1957

2,813,121
RECOVERY OF OXALIC AND TARTARIC ACID

Nicolas Makay, Rio de Janeiro, Brazil

Application March 8, 1956, Serial No. 570,316

9 Claims. (Cl. 260—528)

This invention relates to the recovery of oxalic acid and tartaric acid from the aqueous solution obtained by the nitric acid oxidation of carbohydrate materials.

It is known that carbohydrate materials, under proper conditions, may be converted primarily into oxalic and tartaric acids by oxidization with nitric acid in the presence of metalliferous catalysts. However, up to the present time, the separate recovery of such dibasic acids has required their conversion into derivatives, more particularly, into salts such as zinc, calcium, potassium or other salts, or, for example, into their methyl-ethylesters. All such recovery processes require the reconversion of the derivatives into the original acids after their separation. Such a conversion inevitably causes losses and requires elaborate processing and manufacturing equipment.

It is an object of this invention to simplify the production of tartaric and oxalic acids from carbohydrate materials and to recover them in better yields.

It is another object of the invention to provide a more economical process for producing and recovering tartaric and oxalic acids.

It is a special object of the invention to provide a process for recovering oxalic and tartaric acid from mother liquors without the necessity of converting them into their metal salts or other derivatives.

Other objects will be apparent from the following description:

In accordance with one embodiment of this invention the aqueous solution from which the oxalic and tartaric acid is recovered is obtained by oxidizing a suitable carbohydrate with strong nitric acid in excess of that required for the oxidation at a temperature not substantially exceeding 75° C. in the presence of a suitable metalliferous catalyst, such as $V_2O_5$. Suitable carbohydrate materials include d-glucose, sucrose, starches readily hydrolyzed into a sugar by acids and other carbohydrate materials of the type heretofore used for the production of such dibasic acids.

The oxalic and tartaric acids are recovered from the aqueous solution obtained by the nitric acid oxidization of the carbohydrate material by first cooling the solution to temperatures known to form crystallized oxalic acid, say about 0° C. Then the crystallized oxalic acid is separated from the solution and washed free of mother liquor with cold water and subsequently dried to give a pure product. Thereafter the solution has its nitric acid content increased to a point at which the tartaric acid content of the solution can be converted into crystals. This result may be advantageously achieved by removing water from the solution until a quantity remains such that nitric acid of a desired high concentration can be added thereto in a quantity which will provide the concentration of nitric acid, say 70%, and the quantity thereof necessary or desirable for oxidizing further quantities of carbohydrate material. The resulting strong nitric acid solution is cooled to a low temperature, say below 0° C., which converts a major part of the tartaric acid into tartaric acid crystals. The crystallized tartaric acid, together with impurifying crystals of oxalic acid hydrate is separated from the solution and advantageously washed with a solvent which is a non-solvent for the tartaric acid and oxalic acid hydrate, to remove entrained liquid. The separated crystallized tartaric acid containing the impurifying crystals of oxalic acid hydrate is heated and dried at an elevated temperature which removes the water of crystallization from the oxalic acid hydrate. The dehydrated oxalic acid is removed from the separated crystallized tartaric acid by washing it with a selective solvent therefor which is not a solvent for the crystallized tartaric acid. If desired, the selective solvent can be recovered from the solubilized oxalic acid anhydride and the oxalic acid anhydride recovered as such or returned to the original mother liquor where it can be recovered as a hydrate. In this way both the oxalic acid and the tartaric acid are recovered from the mother liquor in a very high yield and in a very simple manner without the necessity of converting them into chemical derivatives.

In accordance with an advantageous practice of the invention the process is operated on a cyclic basis which may be made continuous as illustrated on the diagrammatic flowsheet. The flowsheet will be explained in terms of a particular embodiment of the invention.

A mother liquor is obtained by the nitric acid oxidation of a carbohydrate in the manner previously described. The mother liquor is cooled to about 0° C. whereby a major proportion of oxalic acid is converted to crystallized oxalic acid hydrate. The crystallized oxalic acid hydrate is separated from the mother liquor and is washed free of mother liquor with cold water and subsequently dried thereby giving a highly purified oxalic acid hydrate. The remaining mother liquor, containing tartaric acid and traces of oxalic acid, has water removed therefrom under a vacuum at a temperature not exceeding 75° C. until a nitric acid solution of a desired high concentration can be obtained by adding a concentrated nitric acid thereto in a quantity which will provide the concentration of nitric acid, say 70%, and the quantity thereof necessary or desirable for oxidizing further quantities of carbohydrate raw material. If necessary, the mother liquor has the nitric acid concentration thereof further increased by adding nitric acid of a higher concentration until a strong nitric acid solution is obtained, say, one having a concentration of 90% to 98%. In this way a nitric acid solution is provided in a concentration in which crystallized tartaric acid can be formed. The resulting strong nitric acid solution is cooled to a temperature of about —10 to —15° C. whereby a major part of the tartaric acid is converted to crystallized tartaric acid. The crystallized tartaric acid, together with impurifying quantities of oxalic acid hydrate, is filtered off and the filtrate is returned to the system. In order to remove the adherent mother liquor, the crystallized tartaric acid containing its impurifying quantities of oxalic acid may be washed with hexane or any other selective solvent which dissolves neither the tartaric acid nor the oxalic acid hydrate. If desired, the hexane may be evaporated and returned to the system and residual nitric acid also returned to the system. The crystallized tartaric acid and the impurifying oxalic acid hydrate is heated to a temperature up to 100° C. to remove water of crystallization from the oxalic acid. The dried and dehydrated crystals are washed with di-ethyl ether which is a selective solvent for the dehydrated oxalic acid. Advantageously the remaining tartaric acid is again washed with pure dry ether to thereby provide a tartaric acid substantially free of oxalic acid. The di-ethyl ether from the washing steps normally contain about 20–25% of oxalic acid and substantially lesser quantities of tartaric acid impurities. The ether used in the washing operation may be readily evaporated and returned to the system and the residual oxalic acid anhydride and impurifying quantities of tartaric acid returned to the original mother liquor where they are recovered in the manner aforesaid.

The oxide of nitrogen gases formed during the oxidation are absorbed in water in an absorption tower thereby giving a nitric acid of about 50–55% concentration. This acid which may be concentrated further is reintroduced into the system in the manner shown.

The invention will be further illustrated by the following examples:

Example 1

Ninety (90) g. of d-glucose is added in about 15 minutes, to 250 ml. of 70% $HNO_3$ containing 7 mg. $V_2O_5$, or to a mother liquor from previous runs at a temperature of 70° C. This temperature is maintained for three hours. Thereafter the reaction mixture is cooled to 0° C., and the crystallized, hydrated oxalic acid is filtered and washed with water at 0° C. Oxalic acid is then dried at 60° C. The yield is 45 g. $(COOH)_2.2H_2O$.

The filtrate is evaporated in vacuum, until the volume is reduced to 85 ml. During cooling 60 ml. of 96% nitric acid is added, and the whole mixture is cooled to —10° C. The crystals are filtered through a cooled filter, and the adherent mother liquor is removed by washing with cooled hexane. The crystals are then removed from the filter and dried at 100° C. Thereafter they are washed twice with 20 ml. of dried di-ethyl ether. The crystals thus washed are dried at 80° C. The yield is 42 g. pure tartaric acid. The ether is evaporated and there remains 5 g. of anhydrous oxalic acid.

The mother liquor filtered from the tartaric acid crystals is increased to 250 ml., containing 70% $HNO_3$ and 7 mg. $V_2O_5$, and the process is reinitiated by adding 90 g. d-glucose.

Example 2

Example 1 is repeated by using liquid dextrose containing 90 g. of d-glucose instead of the 90 g. of the d-glucose thereof.

Like yields are obtained.

Example 3

Mandioca starch is hydrolized with oxalic acid, and from this liquid a quantity containing 90 g. d-glucose is used in the process of Example 1.

Like results are obtained.

Example 4

The process of Example 1 is repeated by substituting in the process thereof 90 g. of sucrose for the 90 g. of d-glucose.

Kindred yields are obtained.

While the foregoing disclosure sets forth numerous details and examples to illustrate the practice of this invention, it will be understood that they may be varied widely without departing from the spirit or the scope of the disclosed invention, which is defined by the appended claims.

What is claimed is:

1. A process for the recovery of oxalic acid and tartaric acid from an aqueous solution obtained by the nitric acid oxidization of carbohydrate materials, comprising forming crystallized oxalic acid by cooling the solution, separating crystallized oxalic acid from the solution, increasing the nitric acid concentration in the solution to a concentration at which tartaric acid can be converted into crystals, cooling the solution and converting a major part of its tartaric acid content to crystallized tartaric acid, and separating and recovering crystallized tartaric acid.

2. A process for the recovery of oxalic acid and tartaric acid respectively as an acid from an aqueous solution obtained by the nitric acid oxidation of carbohydrate materials, comprising separating crystallized oxalic acid from the solution, increasing the nitric acid concentration of the solution to a concentration at which a major part of its tartaric acid content is convertible into crystals at temperatures not exceeding 0° C., converting a major part of the tartaric acid content of the resulting solution to tartaric acid crystals by maintaining it at a temperature not exceeding 0° C., and separating and recovering crystallized tartaric acid.

3. A process for the recovery of oxalic acid and tartaric acid from an aqueous solution obtained by the nitric acid oxidization of carbohydrate materials, comprising forming crystallized oxalic acid by cooling the solution, separating crystallized oxalic acid from the solution, increasing the nitric acid concentration in the solution to a concentration at which tartaric acid can be converted into crystals, cooling the solution and converting a major part of its tartaric acid content to crystallized tartaric acid, separating crystallized tartaric acid containing oxalic acid hydrate as an impurity, heating and drying the separated crystallized tartaric acid containing the oxalic acid hydrate at an elevated temperature which removes water of crystallization from the oxalic acid, removing the impurifying oxalic acid by washing the separated crystallized tartaric acid with a selective solvent for the dehydrated oxalic acid, and recovering the purified tartaric acid.

4. A process for the recovery of oxalic acid and tartaric acid from an aqueous solution obtained by the nitric acid oxidation of carbohydrate material, comprising forming crystallized oxalic acid by cooling the solution, separating crystallized oxalic acid from the solution, removing water from the solution and adding concentrated nitric acid thereto in a quantity increasing the nitric acid concentration in the solution to a concentration at which tartaric acid can be converted into crystals, cooling the solution and converting a major part of its tartaric acid content to crystallized tartaric acid, separating crystallized tartaric acid containing oxalic acid hydrate as an impurity, heating and drying the separated crystallized tartaric acid containing the oxalic acid hydrate at an elevated temperature which removes water of crystallization from the oxalic acid, removing the impurifying oxalic acid by washing the separated crystallized tartaric acid with a selective solvent for the dehydrated oxalic acid, and recovering the purified tartaric acid.

5. A process for the recovery of oxalic acid and tartaric acid from an aqueous solution obtained by the nitric acid oxidation of carbohydrate materials, comprising cooling the solution and converting a major part of its oxalic acid content to crystallized oxalic acid hydrate, separating crystallized oxalic acid hydrate from the solution, removing water from the solution and adding concentrated nitric acid thereto in a quantity increasing the nitric acid concentration in the solution to a concentration at which tartaric acid can be converted into crystals, cooling the solution to a temperature below 0° C., converting a major part of its tartaric acid content to crystallized tartaric acid, separating crystallized tartaric acid containing oxalic acid hydrate as an impurity, heating and drying the separated crystallized tartaric acid containing the oxalic acid hydrate at an elevated temperature and for a period of time which converts the oxalic acid hydrate into dehydrated oxalic acid, removing the impurifying dehydrated oxalic acid by dissolving it in di-ethyl ether, and recovering the purified tartaric acid.

6. A cyclic process for the production and recovery of tartaric and oxalic acid, comprising forming an aqueous solution of said acids by oxidizing a carbohydrate material with concentrated nitric acid in excess of that necessary to oxidize said material in the presence of a metalliferous catalyst, forming crystallized oxalic acid hydrate by cooling the solution, separating crystallized oxalic acid hydrate from the solution, increasing the nitric acid concentration in the solution to a concentration at which tartaric acid can be converted into crystals, cooling the solution and converting a major part of its tartaric acid content to crystallized tartaric acid, separating crystallized tartaric acid containing oxalic acid hydrate as an impurity, heating and drying the separated crystallized tartaric acid containing the oxalic acid hydrate at an elevated temperature which removes water of crystallization from the oxalic acid, removing dehydrated oxalic acid from the separated crystallized tartaric acid by dissolving it in di-ethyl ether, recovering the purified tartaric acid, absorbing oxide of nitrogen gases formed during the oxidation of said carbohydrate in water and returning the absorbed gases to the cycle, and returning the nitric acid solution obtained after the separation of the crystallized oxalic acid hydrate and the crystallized tartaric acid to the cycle to oxidize further carbohydrate material.

7. The process as described in claim 6 in which the di-ethyl ether is evaporated and returned to the cycle to dissolve further quantities of dehydrated oxalic acid and in which the residual dehydrated oxalic acid obtained thereby is returned to the cycle in advance of the place of separation of the crystallized oxalic acid.

8. The process as described in claim 6 in which the carbohydrate material is d-glucose.

9. The process as described in claim 6 in which the carbohydrate material is sucrose.

References Cited in the file of this patent

UNITED STATES PATENTS

| | | |
|---|---|---|
| 2,419,019 | Hales | Apr. 15, 1947 |
| 2,419,020 | Hales | Apr. 15, 1947 |
| 2,419,038 | Sanders | Apr. 15, 1947 |